Jan. 23, 1940. R. G. DREW 2,188,099
ADHESIVE
Original Filed Dec. 12, 1929
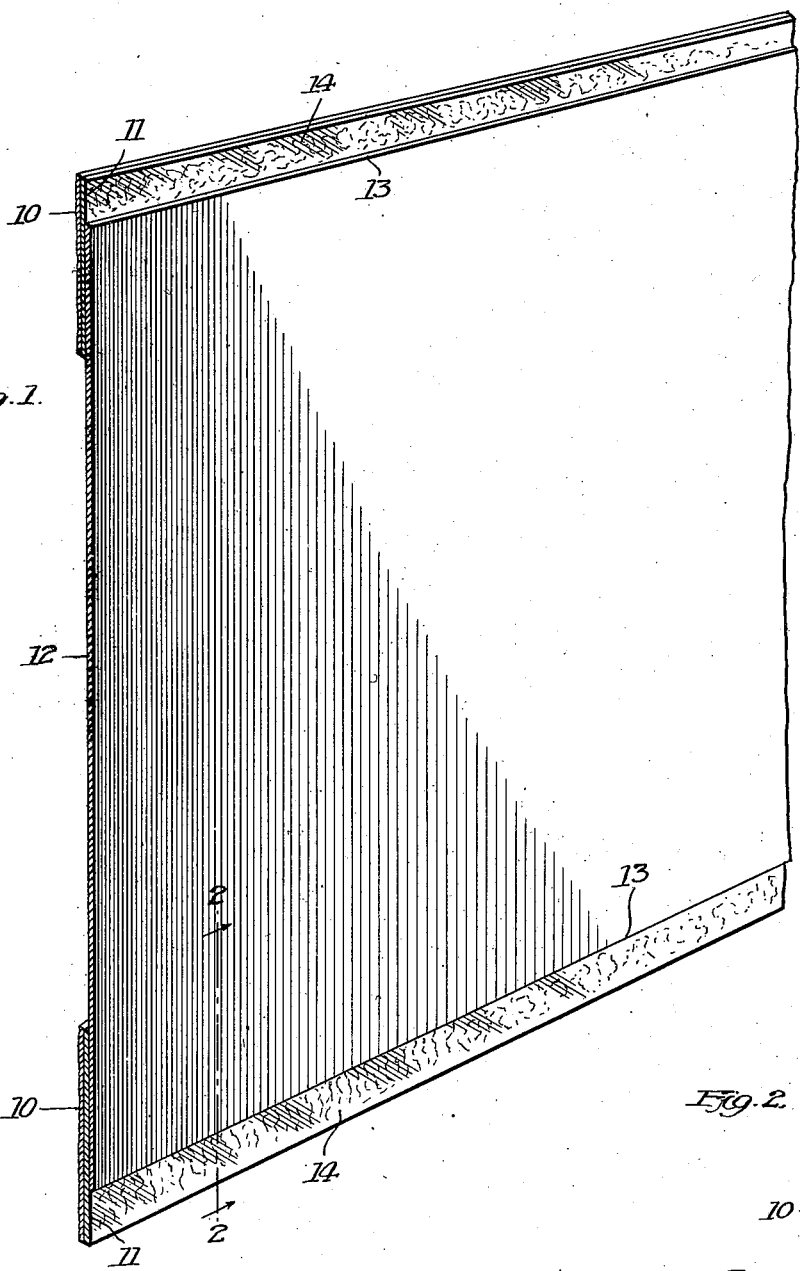
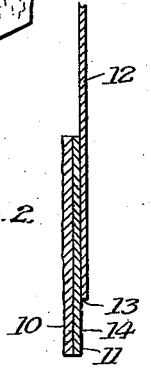
Inventor
Richard Gurley Drew Patented Jan. 23, 1940

UNITED STATES PATENT OFFICE 2,188,099

ADHESIVE

Richard Gurley Drew, St. Paul, Minn., assignor to Minnesota Mining & Manufacturing Company, St. Paul, Minn., a corporation of Delaware Original application December 12, 1929, Serial No. 413,645. Divided and this application August 29, 1931, Serial No. 560,210

10 Claims. (Cl. 134—23.4)

My invention relates in general to adhesives, adhesive compositions or adhesive sheet or coatings, and more particularly to soluble adhesives, adhesive compositions or adhesive sheets or coatings, and still more specifically to heat deformable and energizable water soluble adhesives, adhesive compositions or adhesive sheets or coatings and the method of producing the same.

While the invention has a broad field of usefulness, I have found it of peculiar utility for producing an adhesive coating for limiting the application of the spray of liquid finishing material, such as, for example, lacquers or painting operations in automobile body paint shops, and I therefore find it convenient to describe the invention in connection with such practice and product, it being understood, however, that such limited fields of specific description are employed purely for purposes of illustration of an example of the utility of the invention in its several phases, beside such other novel fields of utility as may appear or hereinafter be pointed out.

In the work referred to specifically above, my improved material may be used as an adhesive for holding protective paper aprons against surfaces on which it is desired to apply the lacquer, paint, paint spray or lacquer spray, such as, for example, glass windows, upholstery, rubber mats on running boards, bright metal parts, covering and wrapping material in general, and the like.

My improved product may also be applied to a surface which, in a subsequent step, is to be finished by an application of a lacquer spray or painting or to a surface which has been finished in order to prevent mingling of the colors as, for example, in two-color work.

My improved material may further be applied to paper or other suitable backing in the form of sheeted material capable of being stored in piled sheets or in the laminations as formed by rolling the sheets, such as tape, or other such form as may b. proper for the purpose contemplated. For certain preferred work, my improved material may be applied to paper to impart minimum point contact and inherent elasticity by applying the same to paper which is toweled or crimped or otherwise shaped, to present a surface other than flat and which has extensibility beyond that of the flat paper web.

It is to be observed that in finishing automobile bodies with lacquers, paints or the like of a plurality of colors, difficulty is found in limiting the application, owing to the division of the spray where such is used, or requiring skillful application of the paint brush when the latter is used. In order to attain a clear and clean-cut line of demarkation between several colors or within limited areas or applying a coating material within limited areas, masks in the form of adhesive tapes have been used. These are of two general types, of which the zinc oxide tape and the rubber base tape form one group, both of which use a cloth backing, and the ordinary gummed paper tape is an example of the other type. Both types of tape referred to present certain marked objections, amongst which may be noted that the adhesive base thereon, such as the zinc oxide, is not water soluble and when removed a residue remains which has to be cleared away by some expensive organic solvent. This is characteristic not only of zinc oxide but the rubber base adhesives. Ordinary gum base tape is energized by wetting and, when applied to a surface, adheres so tenaciously that to remove the same requires soaking with water for a long time and further necessitates scraping, tending to mar the underlying surface.

Furthermore, in the case of the tapes referred to, when applied to a paint coated object, it frequently happens that in separating the tape from the surface, patches of the paint will be lifted from the surface and come away with the tape. Again, it frequently happens that these known tapes curl and become entangled in application and therefore become difficult to manage and apply accurately. Similarly, if not correctly applied in the first instance, the retentive action of the surface to which the tape is applied immediately prevents removal, in this way not only marring the surface to which the tape is applied, but ruining the same for reuse. Likewise, such tapes are often so energetic in their adhering action that the treated coat must be allowed to set and become firm before tape is applied thereto.

In the cases of covering certain materials, such as leather and glass, the known tapes are objectionable in that they will not readily adhere thereto or, if they are forced thereon by pressure, the time element required to apply them and to thereafter clean or remove the same by reason of the adhesive entering the pores of the former or becoming diffused thereover, as in the case of the latter, adds to the cost of operation and detracts from the result produced. It is further known that zinc oxide tape, rubber base tape or gummed paper tape tend to deteriorate with the lapse of time, owing to the drying out of the material and oxidation thereof due to atmospheric exposure, with consequent loss of their power of adhering to the object to which it is intended to be applied.

While for simplicity in describing the invention and as an example of one method and means for making the same I have referred to glue, it is to be understood that I contemplate the employment of any adhesive material suitable for my purposes and that I employ the expression "glue" in the specification and claims in its broadest sense as that class of adhesive materials of organic and protein origin, and gums serving the purpose contemplated by me.

Among the objects of my present invention are the provision of an adhesive or coating material which is nondrying; the provision of an adhesive or coating material which is water soluble and energizable by the action of heat; the provision of an adhesive or coating material upon a base of sheeted material such as paper, which is mild in its action and energizable for application by exposure to heat; the provision of an adhesive or coating material upon a base such as paper which may be applied to a lacquered, painted or varnished surface without injury thereof and which is impermeable to freshly applied lacquer, paint or varnish; the provision of an adhesive or coating material upon a base such as paper, cloth or the like that may be applied to leather or other porous material without infiltration thereof and which is capable of removal therefrom without injury of the surface; the provision of an adhesive or coating material upon a base such as paper, cloth or the like, which may be applied by the application of heat and similarly removed therefrom for reuse; the provision of an adhesive for sheeted material including paper, cloth or the like, which may be stored in piles or laminations without the use of slip sheeting; the provision of a sheeted material including paper, cloth or the like having an adhesive coating thereon which may be stored in piles or laminations without the use of slip sheeting and which is capable of being energized without the application thereto of modifying ingredients but merely by the application of heat; the provision of a sheeted material including paper, cloth or the like which has an adhesive coating thereon and minimum point contact permitting ready removal thereof by forming the same from creped material or toweled paper; the provision of a sheeted material having an adhesive coating thereon and which is resilient, characterized by forming the same from creped or toweled paper; the provision of a sheeted material having a paper or like base treated to render the same impermeable to coating materials such as lacquers, paints, varnishes or the like; the provision of sheeted material having a paper base, treated whereby the same may be adhesively applied to a surface and removed without splitting of the paper; the provision of a sheeted material having a paper base treated whereby an adhesive may be applied thereto without permeating to the other side thereof; the provision of a sheeted material having an uncalendered paper base saturated with an adhesive material whereby one face thereof may be adhesively attached to a surface and separated therefrom without splitting of the paper; the provision of a sheeted material having a bibulous, uncalendered paper base saturated with an adhesive whereby an adherent coating may be applied and the same used for adhesively attaching the same to a surface by the application of pressure and to be separated from such surface without tearing or splitting of the paper or leaving a residuum of the adhesive surface.

My invention still further has for an object thereof the provision of a coating composition adapted to form an adhesive surface energizable by the application of heat or capable of being set by cold characterized by rapidly softening when subjected to heat and equally rapidly setting upon removal of heat.

The invention still further has for an object thereof the provision of a material having a paper base in which the filamentary material of the paper is locked and is resistant to tearing and splitting when in contact with an adhesive surface; the provision of a sheeted material having a paper base surface treated or saturated with a glue or gelatine base composition, further treated to make the surface thereof substantially nonadherent whereby an adhesive, non-drying coating may be applied thereto, such as a gelatine or glue base adhesive, zinc oxide adhesive or rubber base adhesive, to provide material capable of being stacked, piled or rolled without the use of intermediate slip sheeting.

To attain these objects and such further objects as may appear herein or be hereinafter pointed out, I make reference to the accompanying drawing forming a part hereof, in which:

Figure 1 is a perspective view illustrating my invention as applied for use in connection with a painter's mask;

Figure 2 is a section taken on a line 2—2 of Figure 1.

In its preferred form my invention is embodied in a sheeted material in the nature of a tape 10 of a paper base saturated with a glue or gelatine base and coated on one face with a non-drying adhesive 11. In this form, to apply the mask or apron 12 for painting or lacquering operations, a sheeted material which may be paper or the like has attached thereto adjacent the edges 13 along its length a strip of tape 10 by adhering the adhesive coating thereto with a portion 14 projecting beyond the edge 13, with the adhesive surfaces 11 exposed upon the projecting portion 14. The projecting portion 14 may thereafter be applied to fasten the mask or apron wherever desired, the adhesive face 11 included by this projecting portion serving as the means for attachment.

To prepare the tape 10 there is preferably first provided a paper base which is preferably absorbent, approaching blotting paper, calendered or uncalendered. Preferably, however, this paper base is of the unsized, uncalendered variety and is pressed, molded or otherwise formed to have the appearance of toweled fabric, such as by crimping or crepeing the same.

The paper so provided is first submitted to a preliminary treatment by a saturating solution involving a glue base. The saturating solution of the following materials in proportions represent my preferred practice:

| | Pounds |
|---|---|
| Dry glue | 36 |
| Water | 72 |
| Glue solution (approx. 16° Twaddell) | 108 |

Complete swelling is permitted, assisted by warming.

To this is then added 108 pounds of yellow glycerine.

| | Pounds |
|---|---|
| Glue solution (approx. 16° Twaddell) | 108 |
| Pale yellow glycerine | 108 |
| Glue-glycerine water solution | 216 |

To this is added 216 pounds of water.

| | Pounds |
|---|---|
| Glue-glycerine water solution | 216 |
| Water | 216 |
| | 432 |

The paper above described is preferably continuously submerged and passed through a bath of the saturating solution as above prepared and then passed through pressure rolls to squeeze off the excess and then dried by heating. It will be observed that just complete saturation is preferred as this step is closely related to the success or failure of the treatment. An insufficient saturation will be characterized by failure to completely bond the fibres of the unsized paper nor will the saturating solution be present on the back side. An over-sufficient saturation of the paper will render the surface unfit for subsequent coating, which will be observed as this description proceeds.

A paper so treated will be found to have the fibres thereof locked to materially strengthen the paper web and provide a highly flexible sheet. Where I use the toweled or creped variety of paper, this sheet will be found to be substantially elastic and resistant to tearing by shock, as where using the same for wrapping purposes.

Prior to the drying step above mentioned, in one form of the practice of my invention, after the paper has been saturated and passed through the pressure rolls, the web of material is subjected to a treatment tending to insolubilize or tan the glue. The insolubilizing or tanning agents may be formaldehyde in solution or as a vapor, sodium carbonate solution or gallic and tannic acids, chromium trioxide and chrome alum or other chrome and aluminum salts.

My preferred practice is to submerge the paper in a bath consisting of one part commercial formaldehyde and nine parts water by volume. The lapse of time between saturating with glue-glycerine water solution and formaldehyde does not seem to materially affect the quality of the paper. Formaldehyding on one side only, that is, the application of formaldehyde to one face of the previously treated paper, is preferred for purposes which will hereinafter appear where it is desired to further coat the untreated surface and leave the opposite surface substantially inactive.

The formaldehyding on one face only has the advantage that immediate insolubilizing or tanning may be practiced and further, treating one side only is less strain on a paper than complete submersion, particularly where the formaldehyde is in the form of a solution and the saturated paper before the excess water is evaporated is of low tensile strength and therefore less subject to tear or break. The treated surface is then submitted to a neutralizing action and where formaldehyde is used for the insolubilizing or tanning action, I may accomplish neutralization by subjecting the paper to a lime water treatment. It is preferred, however, to submit the formaldehyded web to heat treatment. A temperature of 140 to 160° F. is used to thoroughly dry and volatilize all surplus formaldehyde.

It will be observed that I have described the saturation and the insolubilizing or tanning of the glue base as separate steps. However, the tanning or insolubilizing agent may be incorporated in the saturating solution above described, the tanning action or insolubilizing action of the glue being accomplished simultaneously with the drying of the saturating solution. For the purpose there is added to the saturating solution the tanning or insolubilizing agent. Where I use formaldehyde, I put an aldehyde compound into the glue solution prior to the saturation step. It is preferred to retard the action of the aldehyde so that the insolubilizing or tanning of the glue is accomplished in the drying step. This retarding activity is accomplished by taking any aldehyde compound, such as formaldehyde, and adding ammonia thereto. In practice, equal molecular percentages of formaldehyde and ammonia are used in amounts equivalent to 5% of the aldehyde to the dry weight of the glue.

The saturating solution thus modified is used in the manner previously described. In the drying of the paper, the aldehyde-ammonia compound breaks down to liberate formaldehyde, setting up, insolubilizing or tanning the glue.

Though mere exposure by air drying of the saturated paper will sufficiently insolubilize the glue, due to the decomposition of the ammonia-formaldehyde compound, to liberate formaldehyde, however, it is preferred to hasten the decomposition by heating the saturated web. Ordinarily a temperature of approximately 80° C. will be sufficienly rapid. However, it is preferred to use a temperature between 100 to 120° C., which has been found to sufficiently set the glue with a speed of operation conducive to best practice.

The sheet so saturated and heat treated will have the glue or gelatine base substantially insoluble and, in a sense, waterproof. The paper base will be particularly strengthened and be resistant to sudden shock or stress, making it admirably suited for wrapping purposes. Particularly desirable elastic properties will be obtained where the paper base is of the toweled or creped variety wherein actual elasticity is imparted to the paper in that it retains the crimping or crepeing originally formed or molded in the paper and the tensile strength is materially increased and is tougher in a wet state when carrying its minimum amount of water content, apparently due to a vulcanizing or gluing together of the fibres of the paper into a solid mass. The flexibility augmenting agent further provides a sheeted material resistant to tearing when sharply folding the same.

Where I have described the use of dry glue with pale yellow glycerine, it will be observed that good results have been obtained with cheaper material, such as low grade glue and using the crude rather than the pale yellow glycerine. Other flexibility augmenting agents as a modifier for the glue in place of the glycerine may be used. For certain purposes, particularly as will hereinafter be described, sulphonated oils such as Turkey red oil, sulphonated castor oil, may be used. These materials are not hygroscopic and tend to check, to a certain extent, the tendency to absorb and carry too much water. While I may use hygroscopic agents in general, for modifying the glue to retain a certain amount of water content inducing flexibility, it is preferred to use organic modifiers and for this purpose a sugar content fused in the glycerine of the saturating liquid has been found to be particularly desirable. A paper web saturated with the glue, formaldehyded or tanned as above described, has been found to be waterproof and particularly suitable as a base for forming the adhesive tape previously described when there is coated thereover the non-drying adhesive 11. This non-drying adhesive may be of the glue-gelatine variety or the zinc oxide base or rubber base. Thus, I may use a water soluble coating or a water insoluble adhesive coating. The latter pariculary serves to waterproof the glue base saturated fabric.

The waterproof coating may be heat energizable for adhesive purposes or primarily may be used as a waterproof coating. For the latter purpose, a waterproof coating may be deposited upon the glue saturated web by dipping this web in a solution of asphaltum, removing the excess on the surface by means of pressure rolls. Although coating compositions such as paraffin, Bakelite, drying oils, such as linseed oil, and varnishes may be used, asphaltum, because of its flexible qualities and low cost, is preferred. This coating may be of the tacky variety or of the more heat resistant variety. Where a bitumen base coating material is used, a higher temperature resistant material may be obtained by blending gilsonite and Viscolt and applying them as a coating. The sheet so made with the waterproofing coating either of the adhesive variety or primarily of the waterproofing variety may be used as a waterproofing wrapping paper capable of being stacked or piled without the use of slip sheeting and is particularly tough, resilient and resistant to shock.

Where I desire to form the tape 10 with a non-drying adhesive 11 of the water soluble variety, the following coating composition serving as an adhesive has been found particularly desirable in a manner which will be apparent as this description proceeds. The composition is as follows:

|  | Pounds |
|---|---|
| Glue (dry) | 250 |
| Water | 250 |
| Glycerine | 750 |
| Granulated sugar or 75% of the dry glue weight | 187½ |

This composition may be made by swelling the glue with a quantity of the specified water, assisted by warming and thereafter the granulated sugar and glycerine are added with the remaining quantity of water. The glycerine is used for its flexibility augmenting and water retaining properties and the sugar is used not only because of its water retaining properties but because of its viscosity augmenting properties, further assisting in imparting certain desirable features which will be hereinafter described.

In general it is preferred to use as such viscosity augmenting and water retaining agents, organic compositions. Of these there may be listed the following:

(1) Sulphonated castor oil
(2) Honey (crude or refined)
(3) Paraffin and other waxes
(4) Gum chickle and other gums
(5) Crude glycerine
(6) Small percentages of drying or non-drying oils
(7) Venice turpentine
(8) Shellac.

These organic ingredients I have found particularly desirable in using with a glue saturated paper base as previously made in preference to inorganic hygroscopic materials. I have found that the inorganic hygroscopic materials have a tendency to be absorbed by the paper base backing tending to set the adhesive coating. In the claims where I use the term "organic glue modifying agent" I mean to include thereby such agents as above listed which, in certain cases, serve as substitutes for the sugar component.

In the present form of my adhesive, where I use sugar and glycerine as the glue modifying agents, the adhesive is prepared as follows: the quantity of glue is swelled in water, the action being facilitated by warming. Separately, I fuse the sugar and glycerine content by mixing the same at a temperature of about 250° F. The temperature is preferably retained below 300° F. Temperatures in excess of 300° F. and up to 500° F. will produce an entirely different result. The water-glue mixture and the sugar-glycerine mixture are then combined, preferably at the lower stated temperature. The material so prepared may be spread upon any fabric webbing to obtain a non-drying adhesive coating. This non-drying adhesive coating has been found to be particularly suitable by reason of its water soluble character. Furthermore, it may be applied without modifying ingredients but merely by warming, preferably by warming the back surface of the webbing upon which this adhesive has been spread. A sugar-glycerine modified glue adhesive has been found to have particularly desirable characteristics of water carrying capacity, preventing ageing or drying of the adhesive. The glue or gelatine base has imparted thereto increased body and viscosity. The adhesive has the ability to sharply react to the application of heat or removal thereof, causing the adhesive to be rapidly aggressive upon application of heat, facilitating its application wherever it is desired to be adhered and rapidly setting and staying in position upon the removal of the heat. The composition is particularly homogeneous and remains the same under most varying changes of atmospheric conditions.

In the preparation of the adhesive above described, the highest quality hide glue has been found to be most practical for use in the production of an adhesive best suited for a nondrying tape. Many kinds and grades of glue may be used and still produce the desirable results, among which may be named the water soluble gums, such as tragacanth and acacia. Inferior glues or hide and bone glues have certain valuable characteristics, among which is the possibility of introducing solid materials without increasing the setting properties or jell strength of the adhesive. The working properties of the adhesive may thus be controlled by the proper selection of the solid material in accordance with the varying climatic and atmospheric conditions or to the more particular tastes of the user to modify the aggressiveness of the adhesive to render the same more rapid in its action or retard the same. These solid materials may be magnesium carbonate, lead oxide, whiting, zinc oxide and what may be termed paint pigments.

The adhesive as above made, particularly using the sugar-glycerine modifiers, may be spread upon any webbing, cloth, paper or otherwise. It is preferred, however, to spread this adhesive upon the glue saturated paper previously described, particularly that which has had an insolubilizing or tanning treatment. The adhesive has been found to adhere to the glue saturated paper treated as above described particularly tenaciously and economy of this coating is effected by the non-absorbent character of the previously saturated paper for this adhesive. The adhesive coating makes tenacious contact when a saturated paper base is used. Where insolubilized, tanned or formaldehyded glue saturated paper is used with the adhesive coating, sheets of this material may be stacked, piled or rolled and it has been found that the back surface of the paper will not adhere to the underlying adhesive coating, avoiding the necessity of intermediate slip sheeting. For certain purposes, the formaldehyding of the glue saturated paper may be avoided where stacking of the sheets or the storage of the same is to be in the form of a roll by thinly spreading glycerine upon the adhesive coating and the back thereof. These features are particularly desirable in that not only do they effect economy due to saving of the cost of the slip sheeting but where the adhesive is made in the form of tape wound in rolls, standard lengths may be provided in rolls considerably reduced in size.

The adhesive above described is preferably coated upon the glue saturated and formaldehyde treated paper and will respond to warming to energize its adhesive character or permit its removal and is also capable of stacking, piling or rolling without the use of slip sheeting. For certain purposes, however, the adhesive may be coated upon any paper backing without the saturating and formaldehyding or insolubilizing treatment. In such cases it is preferred to use an adhesive which has been modified by solid materials such as the magnesium carbonate, lead oxide, whiting, paint pigments, ground into the adhesive, to which is preferably added such modifiers as sulphonated oils. This form of adhesive is preferably deprived of all excess moisture and may be used on an untreated paper backing or web of fabric without the use of liners or slip sheeting. This form of adhesive sheeting or tape becomes aggressive or adhesive upon the application of heat, but is not as desirable as the treated paper backing and adhesive coating in that it does not lend itself as readily to reuse upon reheating.

In general, it will be observed that I have provided an adhesive sheet or tape of the non-drying type which is susceptible of use without the addition of modifying and preliminarily wetting agents and which may be applied merely by the application of heat and similarly removed by the same agency. The adhesive and the treated base lend themselves admirably suitable for painting, lacquering or spraying operations. They are impermeable and when applied on surfaces any residue may be readily removed with water.

The specially treated paper and its adhesive coating duplicate results attainable heretofore only with cloth backing and, in addition, has marked advantages thereover. The paper base adhesive tape—

(1) Produces a flexible sheet with more body and density than cloth, particularly where a creped or toweled paper is used;

(2) High tensile strength is obtained by loading the paper with glue, particularly when coated upon by an insolubilizing, tanning or formaldehyding agent. This renders the glue incapable of dissolving in water, which permits it to retain a considerable amount of its strength when in contact with water and hygroscopic materials which may constitute the adhesive film. When glycerine or other modifying elements are used, the saturated sheet is particularly flexible and resistant to breaking thereof by bending;

(3) The saturating and coating accomplish an action of welding, vulcanizing or gluing together of the paper fibres into one solid sheet, which makes impossible any laminating or splitting of the tape when removed from a surface to which it has been applied for some time or when put up in rolls without the use of slip sheeting;

(4) The treatment, particularly the saturating treatment of the paper, particularly when accompanied by insolubilizing, tanning or formaldehyding, also makes impossible any surface fibres breaking away or tearing away from the backing and sticking to the adhesive film when unwound from a roll. Thus, no modification of the adhesive film is effected.

(5) The hygroscopic agent, such as glycerine, retained in the saturated paper, maintains a water content in the paper backing of which it is a part. The adhesive film is therefore prevented from anchoring itself too securely to the reverse side of the backing, that is, a non-drying adhesive secures a hold or adheres to a dry surface much more thoroughly than to one which is moist or damp. Also, as the glue saturated paper has been insolubilized, tanned or formaldehyded, the adhesive coating will not unite with the backing as there is no solution possible between an untreated glue and an insolubilized gelatine.

This application is a division of my application Serial No. 413,645, substituted for my application Serial No. 182,893.

Having thus described my invention and illustrated its use, what I claim as new and desire to secure by Letters Patent, is:

1. An adhesive comprising a mixture of glue, 250 pounds; water 250 pounds; and a preliminary fused mixture of glycerine and sugar comprising glycerine 750 pounds; and sugar 75% of the dry weight of glue.

2. An adhesive comprising an aqueous mixture of a gelatinous material and an organic viscosity augmenting agent chosen from the group consisting of sulphonated castor oil, honey, waxes including paraffin, gums, including gum chicle, glycerine, drying or non-drying oils, Venice turpentine and shellac, the adhesive being characterized by proportions of the organic viscosity augmenting agent resulting in its non-drying properties and sharply reactive to heat to become aggressive in adhesiveness by the inclusion of material percentages of sugar, preliminarily fused in the viscosity augmenting agent and in quantities substantially 75% of the gelatinous material and less than 25% of the viscosity augmenting agent.

3. An adhesive comprising an aqueous mixture of a gelatinous material and an organic viscosity augmenting and water retaining agent, comprising sugar and glycerine, the adhesive being characterized by proportions of the materials resulting in persistence of its jell properties, responsiveness to heat, to become adhesively agressive and tenaciously adhesive to a fabric base and non-adhesive to an insolubilized gelatinous surface, the sugar content being preliminarily fused in the glycerine and constituting substantially 75% of the gelatinous material and about 25% of the glycerine content.

4. For use as a modifying composition for gelatinous materials, adapted to render the gelatinous material rapidly adhesively aggressive to heat, and quick in setting upon removal of heat, comprising a fused sugar and glycerine mixture.

5. For use as a modifying composition for gelatinous materials, adapted to render the gelatinous material rapidly adhesively aggressive to heat, and quick in setting upon removal of heat, comprising a fused sugar and glycerine mixture, the glycerine being present in preponderating proportions.

6. For use as a modifying composition for gelatinous materials, adapted to render the gelatinous material rapidly adhesively aggressive to heat, and quick in setting upon removal of heat, comprising a fused sugar and glycerine mixture, the sugar constituting about 25% of the glycerine.

7. In the process of preparing a modifying composition for gelatinous materials to render the same rapidly adhesively aggressive to heat, and quickly setting upon removal of heat, the step which comprises preliminarily fusing sugar and glycerine before addition of the same to the gelatinous material.

8. In the process of preparing a modifying composition for addition to gelatinous materials to render the same rapidly adhesively aggressive to heat, and quickly setting upon removal of heat, the step which comprises preliminarily fusing sugar and glycerine below about 300 degrees Fahrenheit and at a fusion temperature above 250 degrees Fahrenheit, the fusion being effected before addition of the sugar and glycerine mixture to the gelatinous material.

9. An adhesive comprising a mixture of glue, water, sugar and glycerine in which the sugar and glycerine are preliminarily fused and present in quantities rendering the adhesive rapidly aggressive to heat and setting upon removal of said heat.

10. An adhesive comprising a mixture of glue, water, sugar and glycerine, the sugar and glycerine being present in a preliminarily fused mixture in quantities preponderatingly over the other components, the adhesive being characterized by becoming rapidly aggressive to heat and rapidly setting upon removal thereof.

RICHARD GURLEY DREW.